C. W. STERICK.
Steam-Cooker.
No. 208,434. Patented Sept. 24, 1878.
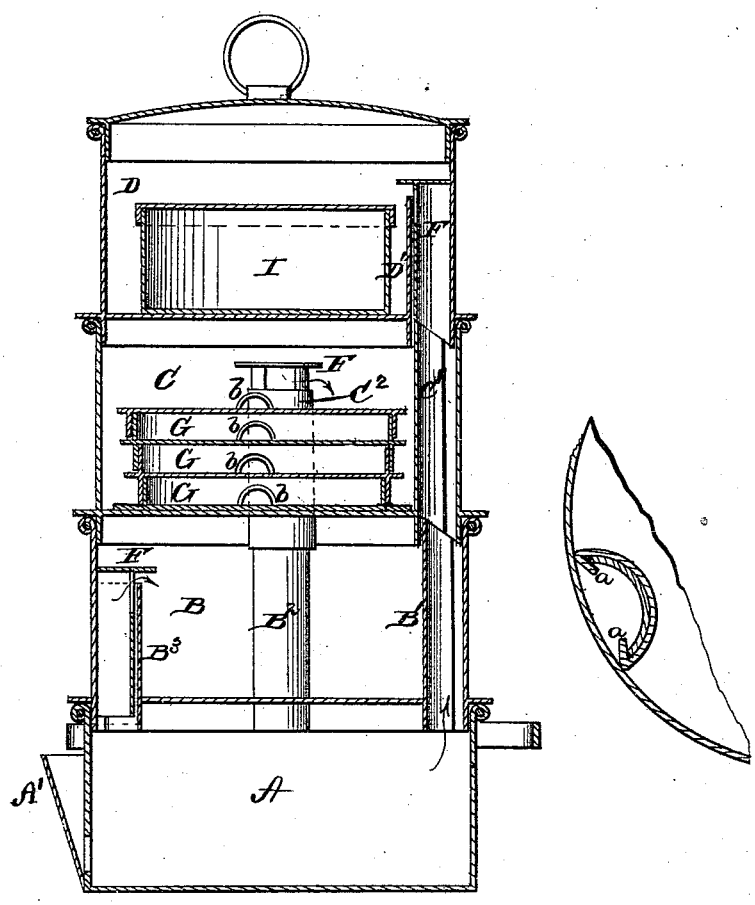
WITNESSES
INVENTOR
Charles W. Sterick
BY
Alexander & Mason
ATTORNEYS

UNITED STATES PATENT OFFICE.

CHARLES W. STERICK, OF DECATUR, GEORGIA.

IMPROVEMENT IN STEAM-COOKERS.

Specification forming part of Letters Patent No. 208,434, dated September 24, 1878; application filed August 15, 1878.

*To all whom it may concern:*

Be it known that I, CHARLES W. STERICK, of Decatur, in the county of De Kalb, and in the State of Georgia, have invented certain new and useful Improvements in Steam-Cookers; and do hereby declare that the following is a full, clear, and exact description thereof, reference being had to the accompanying drawings, and to the letters of reference marked thereon, making a part of this specification.

The nature of my invention consists in certain improvements upon the steam-cooker for which Letters Patent No. 129,613 were granted to me July 16, 1872, as will be hereinafter more fully set forth.

In order to enable others skilled in the art to which my invention appertains to make and use the same, I will now proceed to describe its construction and operation, referring to the annexed drawing, which represents a central vertical section of my improved steam-cooker.

The body of the steam-cooker is made in four sections, A, B, C, and D, fitting into each other, as shown. The first section, A, is the boiler, and contains water only, the other sections containing the articles to be cooked. The section A has on one side a spout, A', for the admission of water into the same. The second section, B, is provided with three steam-tubes, $B^1$ $B^2$ $B^3$, the latter one of which contains a sliding tubular stop or gage, F, by means of which any desired amount of steam can be admitted into the section B, and when an article is cooked the steam can be stopped off altogether by pushing down the slide tube or gage F. The other two tubes, $B^1$ and $B^2$, connect with steam-tubes $C^1$ and $C^2$, respectively, in the section C. The tube, $C^2$, in this section is provided with a similar sliding tube, stop, or gage, F, for the same purpose, while the tube $C^1$ connects with a single tube, D', in the top section, D. This tube D' is also provided with a sliding stop, F, as shown.

By these means, while there is, as in my former patent above referred to, a tube passing from the lower section or water-boiler to each of the other sections to conduct the steam separately to said sections, the steam can be shut off from any section when required without interfering with the supply of steam to the other sections.

The various steam-tubes have along their edges, where connected to their respective sections, inwardly-projecting flanges $a\ a$, which materially strengthen the tubes and prevent them from unsoldering. These flanges also serve as guides for the steam-gages or sliding tubes F to work in, and retain the same in their proper places.

In the third section, C, I have shown a sectional box or pan for cooking different kinds of meat at the same time; but this device may be placed in any of the upper sections, as may be desired. This box or pan consists of a series of pans, G G, fitting one on top of the other, and each provided with a bail or handle, $b$, as shown.

Different kinds of meat may be placed in the different pans and cooked by dry heat without losing any flavor by evaporation or having their flavors mixed in any way. In the top section, D, I show a pan or box, I, which is to cook by dry heat also. This is intended for bread and pies, and having its lid tight, the steam will not enter and mix therewith.

I am aware that a steam-cooker having a single vessel divided by radial partitions and provided with a central tube for carrying steam into any one or more of the compartments is not new, and I do not therefore claim such as my invention.

Having thus fully described my invention, what I claim as new, and desire to secure by Letters Patent, is—

1. In a sectional culinary boiler having the sections placed on top of each other, and a separate tube passing from the lower section or water-boiler to each of the other sections, a sliding tube or gage arranged in the outlet portion of each steam-tube, for the purposes herein set forth.

2. In a sectional culinary boiler, the combination of the steam-tubes, provided with the interior side flanges, $a\ a$, and the sliding tubular gages F, substantially as and for the purposes herein set forth.

In testimony that I claim the foregoing I have hereunto set my hand and seal this 20th day of July, 1878.

CHARLES WESLEY STERICK. [L. S.]

Witnesses:
 FRANK SMYTH,
 A. D. PICQUET.